United States Patent [19]

Horton et al.

[11] Patent Number: 4,707,850

[45] Date of Patent: Nov. 17, 1987

[54] TEST APPARATUS FOR A SUBSCRIBER LINE

[75] Inventors: Harold E. Horton, St. Petersburg; Joseph B. Roberts, Tampa, both of Fla.

[73] Assignee: General Telephone Co. of Florida, Tampa, Fla.

[21] Appl. No.: 924,538

[22] Filed: Oct. 29, 1986

[51] Int. Cl.$^4$ .................... H04M 1/24; H04M 3/28
[52] U.S. Cl. .................................. 379/29; 379/30
[58] Field of Search ................ 379/30, 29, 399, 387

[56] References Cited

U.S. PATENT DOCUMENTS

| | | | |
|---|---|---|---|
| 4,169,220 | 9/1979 | Fields | 379/29 |
| 4,434,328 | 2/1984 | Fields | 379/30 |
| 4,550,225 | 10/1985 | Lynch et al. | 379/29 |

Primary Examiner—Stafford D. Schreyer
Attorney, Agent, or Firm—John A. Odozynski; Peter Xiarhos

[57] ABSTRACT

An apparatus for enabling the performance loop resistance and DC balance checks on a subscriber line includes relay contacts coupled across the line terminals. The apparatus includes circuitry for detecting the application of an activating signal to the line and for optically coupling a resulting trigger signal to a pair of monostable timers. The timer output pulses are arranged so that the relay is energized subsequent to the removal of the activating signal and remains energized during an interval established by the relative durations of the timer output pulses.

16 Claims, 2 Drawing Figures

TEST APPARATUS FOR A SUBSCRIBER LINE

TECHNICAL FIELD

This invention relates to electrical apparatus for performing selected tests on a multi-wire circuit and, more particularly, to an apparatus that facilitates loop-resistance and DC-balance monitoring of a multi-wire subscriber line by selectively connecting the TIP (T) and RING (R) leads to each other as well as to a reference terminal.

BACKGROUND OF THE INVENTION

In order to properly maintain the operation of a telephone system, it is desirable to monitor electrical characteristics, such as the loop resistance and DC balance, of the multi-wire subscriber line that connects customer-premises equipment to the telephone company central office switch.

Heretofore, these characteristics have been monitored by test equipment located at a central test site. The equipment requires service personnel at the customer premises, or some other location remote from the test site, in order to make connection, under direction from the test site, between the various leads that constitute the subscriber line and specified reference terminals, such as ground.

The subject invention mitigates these requirements by employing test apparatus to effectuate the necessary connections between the (T) and (R) leads at the customer premises under remote control from the test site.

DISCLOSURE OF THE INVENTION

The above and other objects, advantages and capabilities are achieved in one aspect of this invention by a test apparatus for a subscriber line. The apparatus includes a contacting portion coupled to a multi-wire line for effecting connection between at least two line terminals or between the line terminals and a reference terminal. Operation of the contacting portion is determined by a signal applied to a control portion. Circuitry coupled to the line detects an activating signal and generates an isolated signal in response thereto. The isolated signal is in turn coupled to a triggering circuit.

A first timer and a second timer, each having an input coupled to an output of the trigger circuit, provide respective first and second pulses. The pulses are initiated substantially coincidentally and in response to a specific component of the activating signal and are characterized by respective first and second pulse durations.

A combining circuit has inputs coupled to the outputs of the first and second timers and an output coupled to the control portion of the switching means so that the switching means operates to effect connection between multi-wire terminals and the reference terminal subsequent the occurrence of the activating signal. The connection persists for a duration dependent on the relative durations of the first and second pulses.

DESCRIPTION OF A PREFERRED EMBODIMENT

For a better understanding of the present invention, together with the objects advantages and capabilities thereof, refer to the following description and appended claims, in conjunction with the accompanying drawings.

Figure 1:
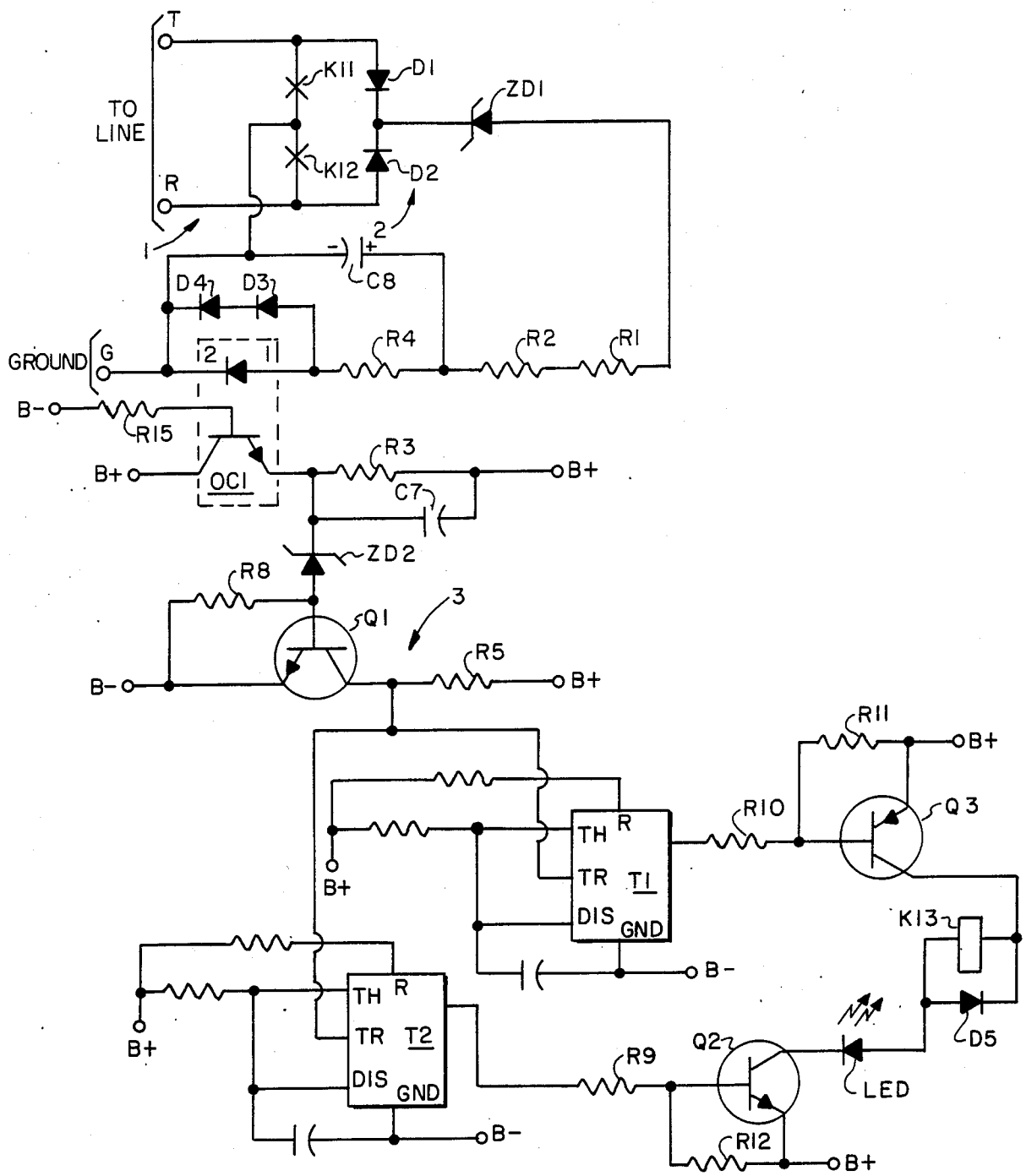
FIG. 1 is a schematic diagram of the subject test apparatus.

Referring now to FIG. 1, the subject invention can be seen to include switching means 1 in the form of a relay K1. The relay includes a pair of contacts, K11 and K12, coupled across the TIP (T) and RING (R) leads of the two-wire subscriber line. K11 is coupled between (T) and ground, while K12 is coupled between ground and (R). Contacting operation of K11 and K12 is determined by the current flowing through control portion K13, that is, through the relay coil.

In general, the subject apparatus is intended to detect the presence of an activating signal superimposed on either the (T) or (R) lead and to appropriately close contacts K11 and K12 in response thereto. In practice the activating signal may assume the form of a substantial DC voltage (100 volts DC, minimum) but other forms of activating signals are of course contemplated by the invention.

The activating signal is detected by a detecting circuit 2 that includes diodes D1 and D2, having anodes respectively coupled to the (T) and (R) leads and cathodes connected in common to the cathode of Zener diode ZD1. ZD1 effectively establishes a threshold level for the activating signal so that low level signals are ineffective to energize K1. The anode of ZD1 is coupled through a series string of resistors R1, R2 and R4 to an optical coupler OC1. Specifically, the resistor string is coupled to an anode of an LED and the cathode of the LED is coupled to ground. A pair of diodes, D3 and D4, are coupled across the LED so as to limit the maximum voltage applied to the LED. A capacitor C8 is connected from the junction of R2 and R4 to ground.

Operation of the detecting circuit is such that the application of an activating signal at either (T) or (R) causes ZDI and, hence, the LED to conduct. The resulting optical signal is coupled to, but electrically isolated from the phototransistor of OC1 so as to render the phototransistor conductive. The phototransistor has a collector coupled to a positive reference potential, B+, and a base coupled through a resistor R15 to a negative reference potential, B−. In practice B+ and B− may assume values of 9 volts and 0 volts respectively. The emitter of the phototransistor is coupled through a parallel RC circuit, R3 and C7, to B−.

The isolated optical signal at the base of the phototransistor causes a positive-going trigger signal to be coupled to the input of a trigger circuit 3 that includes a Zener diode ZD2 and a transistor Q1. ZD2 has a cathode coupled to the emitter of the phototransistor and an anode coupled to the base of Q1. The base of Q1 is coupled through resistor R8 to B− and its collector through R5 to B+. Q1 emitter is coupled directly to B−.

In essence, the application of activating signal at either (T) or (R) ultimately causes Q1 to conduct and the voltage at the output of the trigger circuit, this is, at Q1 collector, to fall with respect to B+. Conversely, removal of the activating signal causes the voltage of Q1 collector to rise. The positive-going edge of the trigger pulse at Q1 collector triggers a pair of integrated circuit timers, T1 and T2, substantially coincidentally.

It should be noted that components R4, C8, R15, R3 and C7 introduce an intended delay between the appearance of an activating signal at either the (T) or (R) leads and the time at which the trigger input to timers T1 and T2 goes low. The delay in provided in order to permit prior or preliminary test procedures to be completed before relay K1 is energized. In addition, the lowpass filtering effect of these components provide a degree of immunity from spurious AC voltages applied between (T) and (R) or between either of those terminals and ground.

Figure 2:
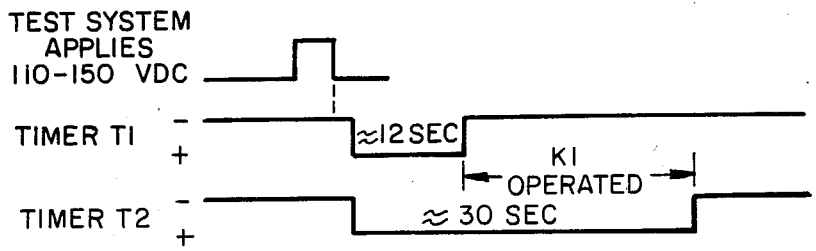
FIG. 2 depicts the expected appearance of significant waveforms at specific points in circuitry comprised by the invention.

As shown in FIG. 2, the removal of the activating pulse initiates positive-going pulses at the respective outputs of T1 and T2. The duration of the pulses is determined by the values of passive components appended. For commercially available monostable timers such as the NE555 these values of appended passive component may be chosen to provide pulse durations ranging from milliseconds to months. With regard to the apparatus and function encountered here, T1 and T2 pulse durations may be assumed to be 12 and 30 seconds respectively.

As shown in FIG. 1, the outputs of T1 and T2 are appropriately coupled to the inputs of a combining circuit 4 that included PNP transistor Q3 and NPN transistor Q2, as well as associated resistors R9, R10, R11, and R12.

Because relay coil K13 is connected serially between the collectors of Q3 and Q2, the relay will be energized only when both Q3 and Q2 are conducting. As can be easily deduced from material explicated hereabove, conduction obtains only when the output of T1 is low and the output of T2 is high. As a result, a time delay is introduced between the time at which the activating signal is removed and the time at which the relay is initially energized. The delay is roughly equivalent to the pulse duration of T1, 12 seconds. Contact closure persists until the demise of the T2 output pulse, approximately 18 seconds.

Furthermore, the apparatus includes an LED coupled in series with relay coil K13 so as to provide a convenient visual indication of the operation of the equipment.

In summary, the subject test apparatus permits electrical testing of a subscriber line to be conducted at customers' premises in a more efficient manner than had been heretofore attainable. The apparatus obviates the need for field service personnel to effect connections manually between the multi-wire subscriber line and specified reference terminals. Use of the apparatus described herein allows such interconnections to be made remotely through the application of an activating signal transmitted from a central test site. Furthermore, although the apparatus has been described in the context of maintenance procedure performed by a telephone operating company, it is clear that the apparatus has applicability to other types of equipment.

Accordingly while there has been shown and described what is at present considered to be a preferred embodiment of the invention, it will be obvious to those skilled in the art that modifications therein and adaptations thereto are contemplated and are within the scope of the invention as defined by the claims appended.

What is claimed is:

1. A test apparatus for a subscriber line, the apparatus comprising:

switching means including a contacting portion coupled to a multi-wire line for effecting connection between at least two terminals associated with the line and between said terminals and a reference terminal, said switching means further including a control portion at which a signal may be applied so as to establish desired operation of the contacting portion, means coupled to the line for detecting an activating signal and for generating an isolated signal in response thereto, a triggering circuit having an input and an output, coupling means for coupling the isolated signal to an input of the triggering circuit, a first timer and a second timer, each having an input coupled to an output of the trigger circuit, said first timer for providing a first pulse at an output thereof and said second timer for providing a second pulse at an output thereof, said first and second pulses initiated substantially coincidentally and in response to the activating signal and characterized by respective first and second pulse durations, and a combining circuit having inputs coupled to the outputs of the first and second timers and an output coupled to the control portion of the switching means so that the switching means operates to effect connection between multi-wire line terminals and the reference terminal subsequent the occurrence of the activating signal, said connection to persist for a duration dependent on the relative durations of the first and second pulses.

2. A test apparatus as defined in claim 1 wherein the detecting means includes a threshold device coupled between the multi-wire line and the coupling means.

3. A test apparatus as defined in claim 2 wherein the detecting means includes circuitry for providing immunity from spurious signals.

4. A test apparatus as defined in claim 3 wherein the threshold device is a Zener diode.

5. A test apparatus as defined in claim 1 wherein said coupling means includes an LED optically coupled to a phototransistor.

6. A test apparatus as defined in claim 5 wherein said coupling means includes circuitry for providing immunity from spurious signals.

7. A test apparatus as defined in claim 1 wherein the triggering circuit includes a Zener diode coupled to a transistor so that the conductivity of the transistor is substantially established by the occurrence of an isolated signal at the input of the triggering circuit.

8. A test apparatus as defined in claim 1 wherein the first timer provides a first pulse of a predetermined duration so as to establish a time delay between the occurrence of an activation signal and the resulting energization of the switching means.

9. A test apparatus as defined in claim 8 wherein the second timer provides a second pulse of predetermined duration so as to establish the length of the time interval during which the switching means is energized.

10. A test apparatus as defined in claim 1 wherein the combining circuit includes first and second transistors each having respective first, second, and third electrodes and wherein the first electrode of the first transistor is coupled to the output of the first timer, the first electrode of the second transistor is coupled to the output of the second timer, the second electrode of the first transistor is coupled to a first reference potential, the second electrode of the second transistor is coupled to a second reference potential and wherein the control portion of the switching means is coupled to both the third electrode of the first transistor and to the third electrode of the second transistor so that the switching means is energized only when both the first and the second transistors are conducting substantial current.

11. A test apparatus as defined in claim 10 further including an element for providing usual indication of operation concurrent with the energization of the switching means.

12. A test apparatus as defined in claim 11 wherein the element is a LED coupled to an output of the combining circuit.

13. A loop resistance and DC balance test apparatus for a subscriber line, the apparatus comprising:
 a switch which, when energized, effectively selectively connects the (T) lead to the (R) lead, or the (T) lead to a reference terminal, or the (R) lead to a reference terminal,
 a Zener diode coupled at one end to the respective (T) and (R) leads so that the Zener diode is rendered conductive in response to an activating signal as may be applied to either or both said leads,
 an optical coupler coupled between another end of the Zener diode and a trigger circuit, the optical coupler for providing an isolated signal to the trigger circuit in response to the application of an activating signal,
 a pair of monostable timers each having trigger inputs coupled to an output of the trigger circuit, said timers triggered in response thereto so that the timers provide respective output pulses which are initiated substantially coincidentally with and in response to at least a specific component of the activating signal, and
 a pair of complementary output transistors each having an input coupled to an output of one of the timers and outputs serially connected to a control portion of the switch so that the switch is energized only during a time interval determined by the relative durations of the respective output pulses provided by the timers.

14. An apparatus as defined in claim 13 wherein the switch is a relay having contacts coupled between the (T) and (R) leads and a coil connected between the outputs of the complementary transistors.

15. An apparatus as defined in claim 13 wherein the Zener diode is respectively coupled to the (T) and (R) leads through a pair of diodes.

16. An apparatus as defined in claim 13 wherein the trigger circuit contains a resistance-capacitance network for effecting a delay between the appearance of an activating pulse and the trigger output pulse and for providing a degree of immunity from spurious AC signals.

* * * * *